(12) United States Patent
Roberts et al.

(10) Patent No.: US 8,829,820 B2
(45) Date of Patent: Sep. 9, 2014

(54) SYSTEMS AND METHODS FOR PROTECTING DISPLAY COMPONENTS FROM ADVERSE OPERATING CONDITIONS

(75) Inventors: John K. Roberts, Grand Rapids, MI (US); Keith J. Vadas, Coppersville, MI (US)

(73) Assignee: Cree, Inc., Durham, NC (US)

( * ) Notice: Subject to any disclaimer, the term of this patent is extended or adjusted under 35 U.S.C. 154(b) by 489 days.

(21) Appl. No.: 11/836,926

(22) Filed: Aug. 10, 2007

(65) Prior Publication Data

US 2009/0040674 A1      Feb. 12, 2009

(51) Int. Cl.
*G05F 1/00*      (2006.01)

(52) U.S. Cl.
USPC ........ 315/309; 315/291; 315/185 S; 315/247; 315/312

(58) Field of Classification Search
USPC ........... 345/82–84, 102, 101, 76, 77, 55, 204, 345/211, 212, 214; 315/247, 246, 291, 297, 315/307–326, 224, 225
See application file for complete search history.

(56) References Cited

U.S. PATENT DOCUMENTS

| | | | |
|---|---|---|---|
| 4,329,625 A | 5/1982 | Nishizawa et al. |
| 5,783,909 A | 7/1998 | Hochstein |
| 5,959,316 A | 9/1999 | Lowery |
| 6,078,148 A | 6/2000 | Hochstein |
| 6,127,784 A | 10/2000 | Grossman et al. |
| 6,153,985 A | 11/2000 | Grossman |
| 6,236,331 B1 | 5/2001 | Dussureault |
| 6,285,139 B1 | 9/2001 | Ghanem |
| 6,350,041 B1 | 2/2002 | Tarsa et al. |
| 6,362,578 B1 | 3/2002 | Swanson et al. |
| 6,411,046 B1 | 6/2002 | Muthu |
| 6,441,558 B1 | 8/2002 | Muthu et al. |
| 6,495,964 B1 | 12/2002 | Muthu et al. |
| 6,498,440 B2 | 12/2002 | Stam et al. |
| 6,510,995 B2 | 1/2003 | Muthu et al. |
| 6,576,881 B2 | 6/2003 | Muthu et al. |
| 6,576,930 B2 | 6/2003 | Reeh et al. |
| 6,630,801 B2 | 10/2003 | Schuurmans |
| 6,674,060 B2 | 1/2004 | Antila |
| 6,741,351 B2 | 5/2004 | Marshall et al. |

(Continued)

FOREIGN PATENT DOCUMENTS

| | | |
|---|---|---|
| JP | 2001-312249 A | 11/2001 |
| JP | 2005-274884 A | 10/2005 |

(Continued)

OTHER PUBLICATIONS

International Search Report and Written Opinion (15 pages) corresponding to International Application No. PCT/US2008/009383; Mailing Date: Oct. 23, 2008.

(Continued)

*Primary Examiner* — Tuyet Thi Vo

(74) *Attorney, Agent, or Firm* — Myers Bigel Sibley & Sajovec

(57) ABSTRACT

Provided are systems and methods for protecting display components from adverse operating conditions. A lighting panel system according to some embodiments includes a lighting panel including a plurality of strings of solid state lighting devices arranged across the panel and a protection system configured to determine an adverse operating condition and adjust a lighting panel luminance setting responsive to the adverse operating condition.

28 Claims, 9 Drawing Sheets

(56) References Cited

U.S. PATENT DOCUMENTS

| | | |
|---|---|---|
| 6,809,347 B2 | 10/2004 | Tasch et al. |
| 6,836,081 B2 | 12/2004 | Swanson et al. |
| 6,841,804 B1 | 1/2005 | Chen et al. |
| 6,841,947 B2 | 1/2005 | Berg-johansen |
| 6,936,857 B2 | 8/2005 | Doxsee et al. |
| 7,009,343 B2 | 3/2006 | Lim et al. |
| 7,023,543 B2 | 4/2006 | Cunningham |
| 7,084,586 B2 * | 8/2006 | Ishihara et al. .............. 315/308 |
| 7,135,664 B2 | 11/2006 | Vornsand et al. |
| 7,140,752 B2 | 11/2006 | Ashdown |
| 7,173,384 B2 | 2/2007 | Plotz et al. |
| 7,186,000 B2 | 3/2007 | Lebens et al. |
| 7,202,608 B2 | 4/2007 | Robinson et al. |
| 7,208,713 B2 | 4/2007 | Ishiguchi |
| 7,213,940 B1 | 5/2007 | Van De Ven et al. |
| 7,242,150 B2 * | 7/2007 | DeJonge et al. ............. 315/225 |
| 7,256,557 B2 | 8/2007 | Lim et al. |
| 7,295,180 B2 * | 11/2007 | Ichikawa et al. ............. 345/102 |
| 7,348,960 B2 * | 3/2008 | Huang et al. ................. 345/102 |
| 7,402,960 B2 * | 7/2008 | Kajita ........................... 315/291 |
| 7,659,672 B2 * | 2/2010 | Yang ............................. 315/224 |
| 7,688,003 B2 * | 3/2010 | Yamada et al. ............... 315/291 |
| 2002/0190972 A1 | 12/2002 | Ven de Van |
| 2003/0089918 A1 | 5/2003 | Hiller et al. |
| 2004/0183476 A1 * | 9/2004 | Ishizuka ....................... 315/291 |
| 2006/0022918 A1 * | 2/2006 | Tang et al. ..................... 345/84 |
| 2006/0105482 A1 | 5/2006 | Alferink et al. |
| 2006/0221644 A1 | 10/2006 | Kwon et al. |
| 2007/0115228 A1 | 5/2007 | Roberts et al. |
| 2007/0159736 A1 | 7/2007 | Kajita |
| 2007/0247414 A1 | 10/2007 | Roberts |
| 2007/0257869 A1 * | 11/2007 | Huang et al. ................... 345/82 |
| 2008/0088254 A1 * | 4/2008 | Yang ............................. 315/247 |
| 2008/0224634 A1 * | 9/2008 | Scilia ............................ 315/294 |
| 2008/0297067 A1 * | 12/2008 | Wang et al. ................... 315/294 |
| 2009/0017903 A1 * | 1/2009 | Mizoguchi et al. ............. 463/20 |
| 2010/0013402 A1 * | 1/2010 | Chaffai et al. ................ 315/291 |

FOREIGN PATENT DOCUMENTS

| | | |
|---|---|---|
| JP | 2006-147373 A | 6/2006 |
| JP | 2006-210835 A | 8/2006 |
| JP | 2007-188692 A | 7/2007 |
| WO | WO 2007/046026 A1 | 4/2007 |
| WO | WO 2007/061758 A1 | 5/2007 |
| WO | WO 2007/061811 A1 | 5/2007 |

OTHER PUBLICATIONS

U.S. Appl. No. 11/755,149, filed May 30, 2007, Van De Ven.
U.S. Appl. No. 12/257,804, filed Oct. 24, 2008, Negley.
Perduijn et al, "Light Output Feedback Solution for RGB LED Backlight Applications", SID 2003 Digest 43.2/A.
Zhu et al., "Optimizing the Performance of Remote Phosphor LED, First International Conference on White LEDs and Solid State Lighting", 5 pages, Japan (Nov. 26-30, 2007).
International Search Report and Written Opinion (9 pages) corresponding to International Application No. PCT/US07/12707; Mailing Date: Aug. 21, 2008.
Japanese Office Action Corresponding to Japanese Patent Application No. 2010-519961; Mailing Date: Mar. 16, 2012; Japanese Text, 3 pages, English Translation Thereof, 4 pages.
Chinese Third Office Action Corresponding to Chinese Patent Application No. 200880111463.8; Date of Issue; Dec. 11, 2012; Foreign Text, 4 Pages, English Translation Thereof, 7 Pages.
English Translation of Chinese Office Action Corresponding to Chinese Patent Application No. 200880111463.8; Mailing Date: May 3, 2012; 5 pages.
Chinese Fourth Office Action Corresponding to Chinese Patent Application No. 200880111463.8; Date of Issue: May 29, 2013; Foreign Text, 6 Pages, English Translation Thereof, 3 Pages.

* cited by examiner

SYSTEMS AND METHODS FOR PROTECTING DISPLAY COMPONENTS FROM ADVERSE OPERATING CONDITIONS

FIELD OF THE INVENTION

The present invention relates to lighting, and more particularly, to controlling a solid state lighting panel.

BACKGROUND

Solid state lighting arrays are used for a number of lighting applications. For example, solid state lighting panels including arrays of solid state lamps have been used as direct illumination sources, for example, in architectural and/or accent lighting. A solid state lamp may include, for example, a packaged light emitting device including one or more light emitting diodes (LEDs). Inorganic LEDs typically include semiconductor layers forming p-n junctions. Organic LEDs (OLEDs), which include organic light emission layers, represent another type of solid state light emitting device. Typically, a solid state light emitting device generates light through the recombination of electronic carriers, i.e. electrons and holes, in a light emitting layer or region.

Solid state lighting panels are commonly used as backlights for small LCD display screens, such as LCD display screens used in portable electronic devices. In addition, there has been increased interest in the use of solid state lighting arrays for backlights of larger displays, such as LCD television displays.

For smaller LCD screens, backlight assemblies may employ white LED lamps that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index of a light source is an objective measure of the ability of the light generated by the source to accurately illuminate a broad range of colors. The color rendering index ranges from essentially zero for monochromatic sources to nearly 100 for incandescent sources. Light generated from a phosphor-based solid state light source may have a relatively low color rendering index.

For large-scale backlight and illumination applications, it is often desirable to provide a lighting source that generates a white light having a high color rendering index, so that objects and/or display screens illuminated by the lighting panel may appear more natural. Accordingly, such lighting sources may typically include an array of solid state lamps including red, green and blue light emitting devices. When red, green and blue light emitting devices are energized simultaneously, the resulting combined light may appear white, or nearly white, depending on the relative intensities of the red, green and blue sources. There are many different hues of light that may be considered "white." For example, some "white" light, such as light generated by sodium vapor lamps, may appear more yellowish, while other "white" light, such as light generated by some fluorescent lamps, may appear more bluish in color.

Solid state lamps, such as LED's, are current-controlled devices in the sense that the intensity of the light emitted from an LED is related to the amount of current driven through the LED. One common method for controlling the current driven through the solid state lamps to achieve desired intensity and color mixing is a Pulse Width Modulation (PWM) scheme. PWM schemes pulse the solid state lamps alternately to a full current "ON" state followed by a zero current "OFF" state.

A solid-state backlight may be the largest power load and heat source in a device that uses solid state backlighting. Such displays may include components that might be degraded under certain adverse conditions. Such conditions might be created if the system power exceeds design specifications and/or if the system temperature exceeds design specifications.

SUMMARY

Some embodiments of the present invention may include methods of protecting components in a lighting panel including a plurality of strings of solid state lighting devices. In such embodiments, methods may include estimating an operating system value in the lighting panel, determining that the operating system value exceeds a first operating system limit, and iteratively adjusting a lighting panel luminance setting responsive to the operating system value exceeding the first operating system limit. Embodiments of such methods may further include determining that the operating system value exceeds a second operating system limit that is greater than the first operating system limit and setting the lighting panel luminance setting to a minimum value.

Some embodiments may include incrementally increasing the lighting panel luminance setting if the operating system value is less than the first operating system limit.

In some embodiments, the operating system value includes a power dissipation value, wherein the first operating system limit includes a first power limit, and wherein the second system operating limit includes a second power limit.

In some embodiments, the operating system value includes a panel temperature value, wherein the first operating system limit includes a first temperature limit, and wherein the second system operating limit includes a second temperature limit.

Some embodiments may be provided as a lighting panel system. Some embodiments of such a system include a lighting panel including a plurality of strings of solid state lighting devices arranged across the panel and a protection system configured to determine an adverse operating condition and adjust a lighting panel luminance setting responsive to the adverse operating condition.

In some embodiments, the adverse operating condition includes power dissipation that exceeds a system power limit. Some embodiments provide that if the power dissipation exceeds a first power limit, the protection system is configured to reduce the lighting panel luminance setting incrementally until the power dissipation is below the first power limit. Some such embodiments provide that if the power dissipation exceeds a second power limit that is greater than the first power limit, the protection system is configured to reduce the lighting panel luminance setting to a minimum value.

In some embodiments, the protection system is further configured to determine the power dissipation via a real time power calculation. The real time power calculation of some embodiments utilizes a stored power value that is pre-computed during system calibration and memory accessible by a system microcontroller. In some embodiments, the stored value includes a total quiescent power dissipation that includes the total power dissipation when the plurality of strings are in a de-energized state corresponding to a zero percent duty cycle. In some embodiments, the stored value includes a value specific to a portion of the plurality of strings including solid state lighting devices that emit light in a first dominant wavelength and determined by the expression $$\sum_{i=0}^{N}(P_i \times Ratio_i).$$

The real time power calculation of some embodiments utilizes base duty cycles that are available in real time.

Some embodiments provide that if the lighting panel luminance setting is adjusted responsive to the adverse operating condition, an error signal is registered in a data storage location.

Some embodiments include a gain adjuster configured to determine a response magnitude corresponding to a magnitude of the adverse operating condition to improve a performance of the protection system in response to the adverse operating condition.

Some embodiments include a hysteresis function configured to generate hysteresis values corresponding to an operating condition threshold to improve a performance of the protection system in response to the adverse operating condition.

In some embodiments, the adverse operating condition includes a panel temperature that exceeds a system temperature limit. In some embodiments, the protection system is configured to determine the panel temperature using a driver temperature sensor. Some embodiments provide that if the panel temperature exceeds a first temperature limit, the protection system is configured to reduce the lighting panel luminance setting incrementally until the panel temperature is below the first temperature limit. Some embodiments provide that if the panel temperature exceeds a second temperature limit, the protection system is configured to reduce the lighting panel luminance setting to a minimum value.

Embodiments of the present invention may also include a backlit display device configured to utilize the lighting panel system described herein.

Embodiments of the present invention include methods of protecting components in a lighting panel including a plurality of strings of solid state lighting devices. In some embodiments, such methods include determining an adverse operating condition in the lighting panel and adjusting a lighting panel luminance setting responsive to the adverse operating condition. Some embodiments include sending an error signal to a data storage location responsive to adjusting the lighting panel luminance setting.

In some embodiments, adjusting the lighting panel luminance setting includes adjusting a response gain to improve a response to the adverse operating condition. In some embodiments, adjusting the lighting panel luminance setting includes generating hysteresis values to improve a response to the adverse operating condition.

In some embodiments, determining the adverse operating condition includes determining that a panel temperature exceeds a system temperature limit. In some embodiments, determining that the panel temperature exceeds the system temperature limit includes receiving a signal from a driver temperature sensor.

In some embodiments, determining the adverse operating condition comprises determining that power dissipation exceeds a system power limit. Some embodiments provide that if the power dissipation exceeds a first power limit, reducing the lighting panel luminance setting incrementally until the power dissipation is below the first power limit. Some embodiments provide that if the power dissipation exceeds a second power limit the is greater than the first power limit, reducing the lighting panel luminance setting to a minimum value.

In some embodiments, determining the power dissipation includes calculating a real time power value. In some embodiments, calculating the real-time power value includes retrieving a stored power value that is precomputed during system calibration. In some embodiments, the stored power value includes a total quiescent power dissipation that includes the total power dissipation when the plurality of strings are in a de-energized state. In some embodiments, calculating the real-time power value includes determining base duty cycles in real time.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1:
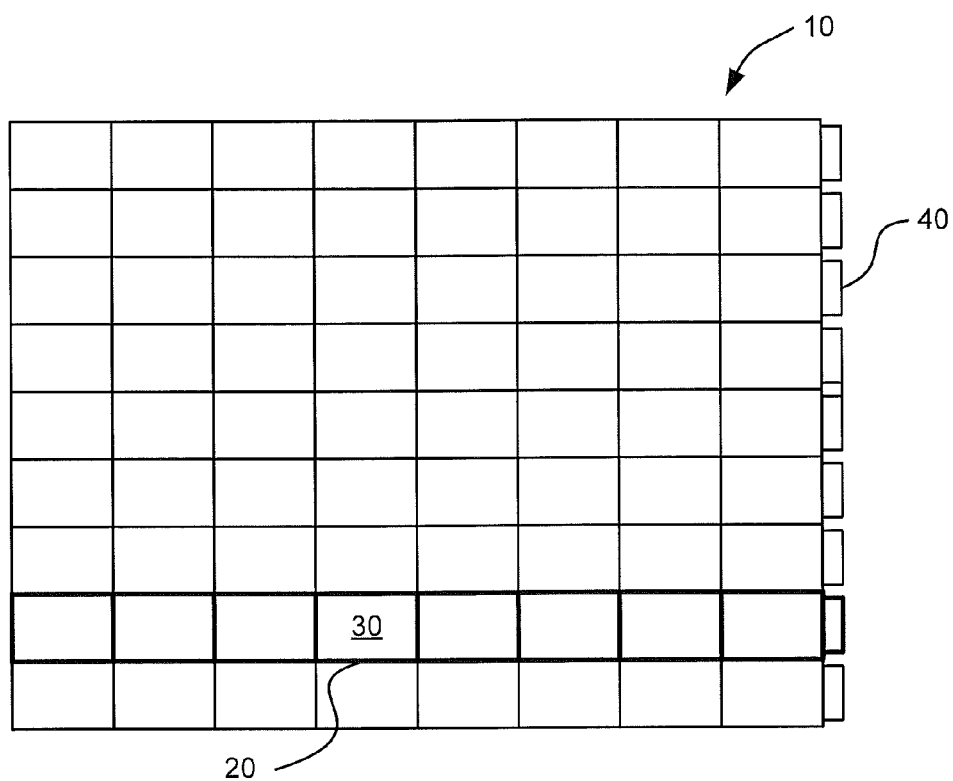
FIG. 1 is a block diagram illustrating a lighting panel according to some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will also be understood that when a first element, operation, signal, and/or value is referred to as "responsive to" another element, condition, signal and/or value, the first element, condition, signal, and/or value can exist and/or operate completely responsive to or partially responsive to the other element, condition, signal, and/or value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the invention may arise from the recognition that a solid-state backlight is the largest power load and heat source in a backlit LCD display system. Accordingly, some embodiments establish a light panel system that can adjust a lighting panel luminance setting responsive to adverse operating conditions. In this manner, degradation of display components may be reduced.

Reference is made to FIG. 1, which is a block diagram illustrating a lighting panel according to some embodiments of the invention. A lighting panel 10 may include multiple lighting panel bars 20 each having multiple tiles 30 that include solid-state emitters. The solid-state emitters may be serially arranged in, for example, strings. Each of the lighting panel bars 20 may include an interface 40 configured to provide electrical interconnection with a control system.

Figure 2:
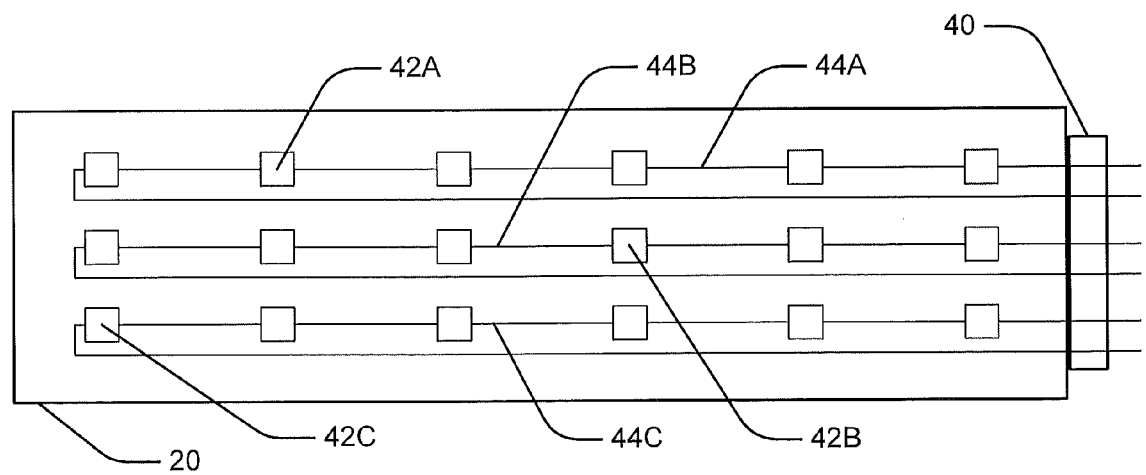
FIG. 2 is a schematic diagram illustrating a lighting panel bar according to some embodiments of the present invention.

Reference is now made to FIG. 2, which is a schematic diagram illustrating a lighting panel bar 20 according to some embodiments of the present invention. In some embodiments, a lighting panel bar 20 can include multiple strings 44A-C that can each include multiple solid-state lighting devices 42A-C. Each string 44 may be configured to be substantially the same or each one can differ in one or more ways. In some embodiments, each string 44A-C includes solid-state lighting devices 42A-C that emit light in a different dominant wavelength. For example, solid state lighting devices 42A can be configured to emit light having a dominant wavelength generally corresponding to the color red. Similarly, solid-state lighting devices 42B and 42C can be configured to emit light having dominant wavelengths corresponding to the colors green and blue, respectively.

A lighting panel bar 20 of some embodiments may include one or more strings 44 having solid-state lighting devices 42 of different colors. For example a lighting panel bar 20 can include a least one string 44 having red solid-state lighting devices, a least one string 44 having green solid state lighting devices, and a least one string 44 having blue solid-state lighting devices. In this manner, by selectively controlling the amount and/or duty cycle of current supplied to each string, the color hue and/or brightness of the light emitted by the panel lighting bar 20 can be controlled. The strings 44A-C can be controlled independent of one another or as a group corresponding to the panel lighting bar 20. Although discussed with reference to solid-state lighting devices configured to emit light having different dominant wavelengths, the systems and methods herein may also be utilized in systems using solid-state lighting devices configured to emit light in a single dominant wavelength. Furthermore, systems, etc., may use solid state LED's including phosphors that, when energized, emit light having multiple wavelengths and/or that otherwise emit broad-spectrum light, such as, for example, a phosphor coated blue LED.

Figure 3:
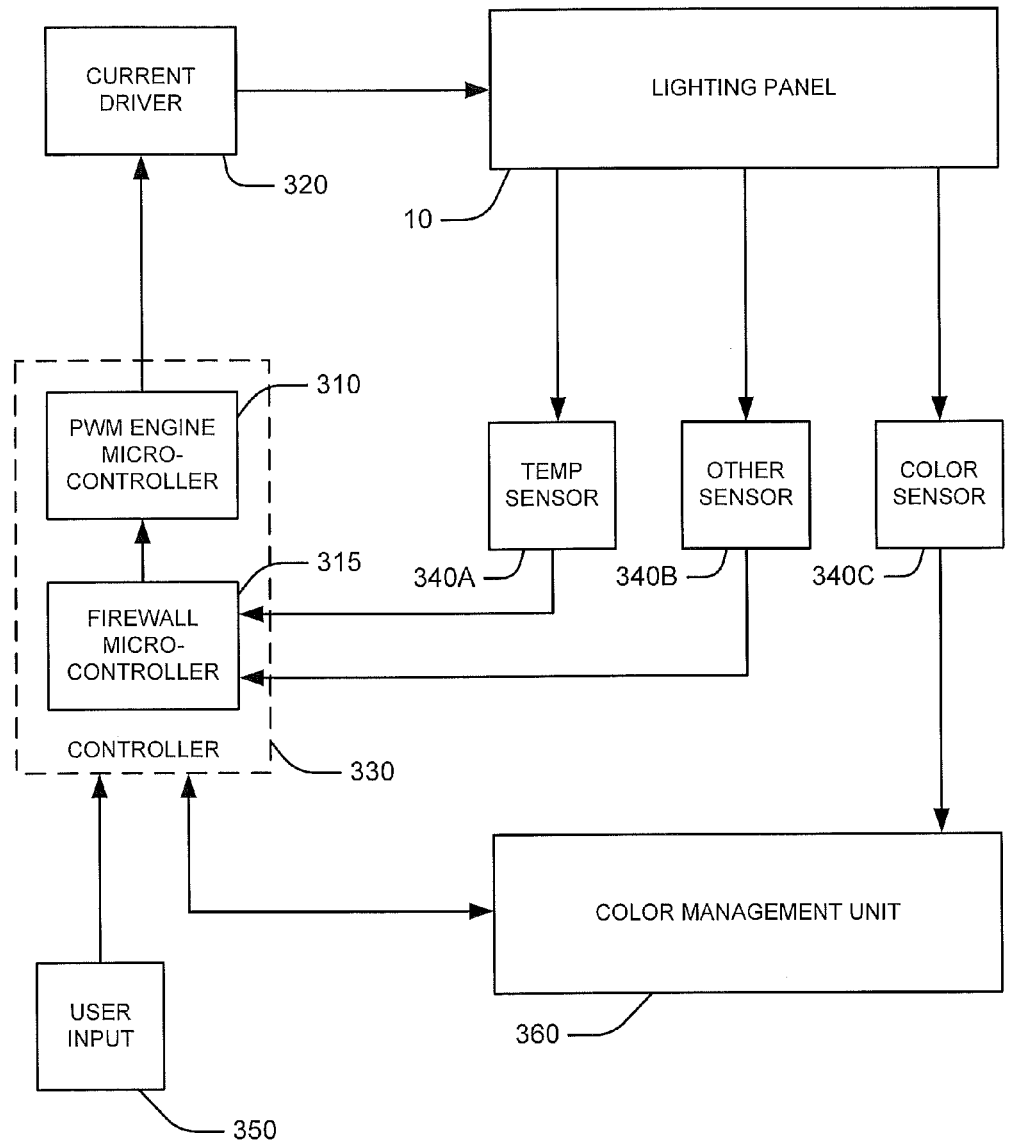
FIG. 3 is a block diagram illustrating a lighting panel system according to some embodiments of the present invention.

Reference is now made to FIG. 3, which is a block diagram illustrating a lighting panel system according to some embodiments of the present invention. A lighting panel 10 may be a solid-state backlighting panel that may include multiple solid-state emitters arranged in strings. In some embodiments, the lighting panel system includes a color management unit 360 configured to receive sensor input from color sensor 340C and generate color management information to control the light output of the strings.

One common method for controlling the current driven through the strings is a Pulse Width Modulation (PWM) scheme. PWM schemes pulse the solid state lamps alternately to a full current "ON" state followed by a zero current "OFF" state. The output of the string may be controlled by varying the duty cycle, which is the percent of the cycle that the string is placed in an "ON" state. In some embodiments, the color management information is provided to a microcontroller 330 that uses the color management information and sensor inputs from temperature and other sensors 340A-B to adjust PWM duty cycles for the strings to cause the panel 10 to emit light having a desired color point and/or luminance setting.

In some embodiments, the microcontroller 330 they be configured to accept user input 350, which may also be used to adjust the PWM duty cycles of the strings. The PWM duty cycle information may be used by the microcontroller 330 to control current drivers 320. The microcontroller 330 may include a firewall microcontroller 315 and a PWM microcontroller 310. The microcontroller 330 may also be used to perform real-time power calculations.

Figure 4:
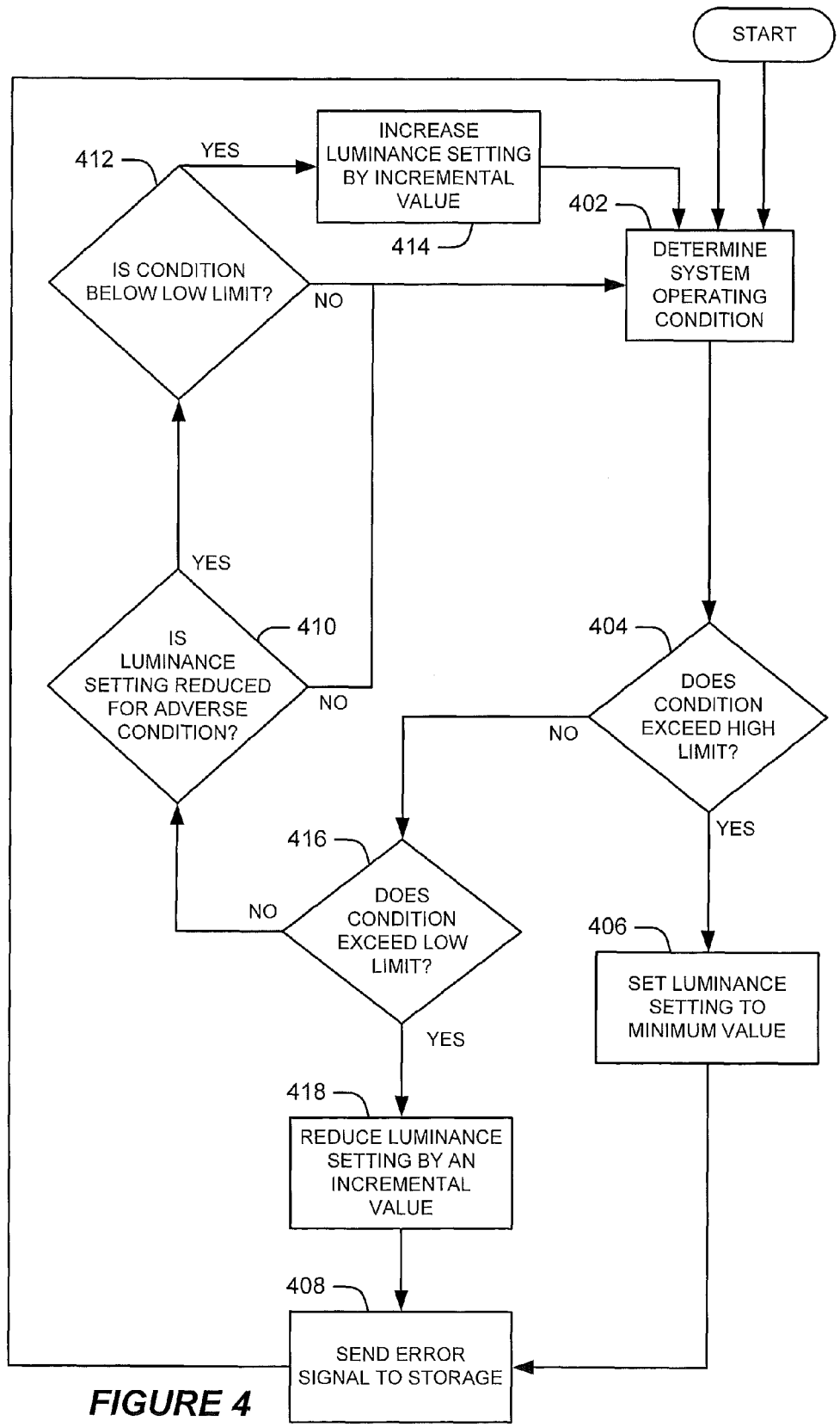
FIG. 4 is a flow diagram illustrating operations for protecting display components from adverse operating conditions according to some embodiments of the present invention.

Reference is now made to FIG. 4, which is a flow diagram illustrating operations for protecting display components from adverse operating conditions according to some embodiments of the present invention. Operations for protecting display components include determining a system operating condition (block 402). In some embodiments a system operating condition can include, for example, a power dissipation and/or a panel temperature, among others. In this regard, determining the power dissipation may be accomplished using, for example, real-time power calculation. Determining a panel temperature may be accomplished using a driver temperature sensor to provide an indication as to the panel temperature.

Operations may determine if the prospective condition exceeds a high temperature limit (block 404). If the system operating condition exceeds a high limit value, then the luminance level may be set to a minimum value (block 406). In some embodiments, a minimum value may be determined by a system minimum value such as, for example, a composite luminance value that maintains output ratios among the various strings of solid-state emitters. In some embodiments, a minimum value may be determined as the minimum duty cycle for each of the strings of solid-state emitters. Thus, by way of example, where temperature driver indicates the panel temperature is greater than a high temperature limit, the duty cycle for all of the strings of solid-state emitters may be reduced to, for example, twenty percent.

After the luminance level is set to minimum value, an error signal may be sent to a data storage location (block 408). In some embodiments, the data storage location may be a register, processor memory, and/or system memory, among others. In some embodiments, the error signal may include a component that maintains a historical record and/or log of occurrences when a system operating condition exceeds a high and/or low limit value. In some embodiments, the error signal may include a component that indicates the current status of the luminance setting responsive to system operating conditions that exceed limit values. In this manner, the error signal may be used to communicate historical and/or current operating conditions. After sending the error signal to a data storage location, the operations may continue to determine system operating conditions (block 402).

If the system operating condition does not exceed a high limit value, as determined in block 404, the operations may determine if the system operating condition exceeds a low limit value (block 416). If the system operating condition does exceed a low limit value, the luminance setting may be reduced by an incremental value (block 418). The incremental value may be variable based on a control system principles, such as, for example, an adjustable control system gain and/or hysteresis, among others. If the luminance setting is reduced by an incremental value responsive to an adverse operating condition relative to the low limit value, an error signal may be sent to the data storage location (block 408). After sending the error signal to a data storage location, the operations may continue to determine system operating conditions (block 402).

If the system operating condition does not exceed a low limit value, as determined in block 416, the operations may determine if the luminance setting is reduced for a previously occurring adverse operating condition (block 410). If the luminance setting is a not reduced for a previously occurring adverse condition, then the operations may continue to determine system operating conditions (block 402). If luminance setting is reduced for previously occurring at first condition, then the operations determine if the system operating condition is below the low limit value (block 412). If the system operating condition is below the low limit value, then the luminance setting may be increased by an incremental value (block 414). If the system operating condition is not below the low limit value, the operations may continue to determine system operating conditions without adjusting the luminance setting (block 402).

Figure 5:
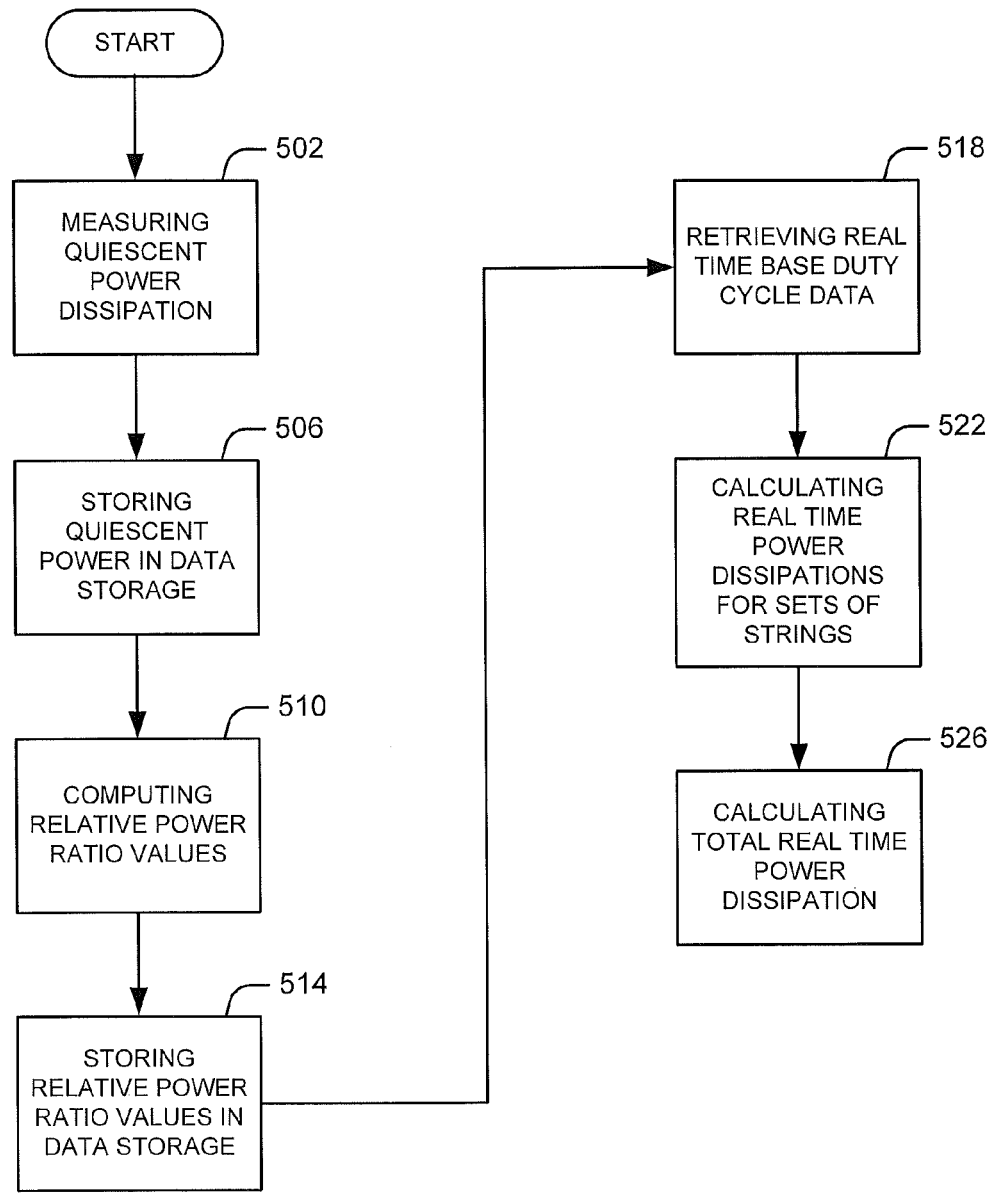
FIG. 5 is a flow diagram illustrating operations for calculating real-time power dissipation in a lighting panel according to some embodiments of the present invention.

Reference is now made to FIG. 5, which is a flow diagram illustrating operations for calculating real-time power dissipation in a lighting panel according to some embodiments of the present invention. The total lighting panel power dissipation may be computed as:

$$P_T = P_R + P_G + P_B + P_Q,$$

where $P_T$ is the total lighting panel power dissipation, $P_R$, $P_G$, and $P_B$ are the total power dissipation of all red, green, and blue strings at the current duty cycles, respectively, and $P_Q$ is the total measured quiescent power dissipation.

Operations for calculating real-time power dissipation include measuring quiescent power dissipation (block 502). The quiescent power dissipation may be characterized as the total power dissipation when all strings are in a de-energized state. For example, the quiescent power dissipation may be measured/computed during, for example, post burn-in testing. The measured/computed quiescent power dissipation value may be stored in a database and/or other data storage location (block 506).

The power dissipation of all red strings, for example, may be determined by:

$$P_R = BDC_R \times \sum_{i=0}^{N} (P_{ri} \times Ratio_{ri}),$$

where $BDC_R$ is the base duty cycle corresponding to the red strings that is known and used in real time by a color management unit and/or a controller (FIG. 3). The power dissipations for the individual red strings $P_{ri}$ for each of the N strings may be determined during post burn-in testing and stored. In some embodiments, the measurement method for generating the $P_{ri}$ values may include driving an individual string at a 100% duty cycle, multiplying the supply current by the supply voltage, in subtracting the pre-measured total quiescent power from the result. The relative power ratio values $Ratio_{ri}$ may be computed during post burn-in testing (block 510). In some embodiments, the relative power ratio values $Ratio_{ri}$ may include the power ratios for individual red, green and blue strings. The relative power ratio values may also be used in generating constants for determining the individual string duty cycles in a PWM controller. The relative power ratio values may thus be stored in a database of other data storage location (block 514). Thus, the portion of the formula for calculating the power dissipation in the red strings expressed as $$\sum_{i=0}^{N} (P_{ri} \times Ratio_{ri})$$

may be computed and stored during post-burn-in testing and stored in a database and/or other data storage location. The same calculations may be performed for the green and blue strings and the corresponding values stored in a database and/or other data storage location. For example, the stored values corresponding to a green and blue strings may be determined, respectively, by the expressions $$\sum_{i=0}^{N} (P_{gi} \times Ratio_{gi}) \text{ and } \sum_{i=0}^{N} (P_{bi} \times Ratio_{bi}).$$

Real time base duty cycle data $BDC_R$ may be retrieved from the color management unit and/or the controller (FIG. 3) (block 518). The real time power dissipations may be calculated for sets of strings (block 522). For example, as discussed above, the total power dissipation of all red strings $P_R$ at the current duty cycles may be computed as the product of the stored value calculated by $$\sum_{i=0}^{N} (P_{ri} \times Ratio_{ri})$$

and the retrieved real time base duty cycle value $BDC_R$ for all the red strings. Similarly, the total power dissipation of all green and blue strings, $P_G$ and $P_B$, respectively, may be calculated by the products of similarly obtained values corresponding to stored and retrieved values for the green and blue strings, respectively. For example, the total power dissipation of the green and blue strings may be determined by $$P_G = BDC_G \times \sum_{i=0}^{N} (P_{gi} \times Ratio_{gi})$$

and $$P_B = BDC_B \times \sum_{i=0}^{N} (P_{bi} \times Ratio_{bi}),$$

respectively.

The total real-time power dissipation may then be calculated (block 526). The total real-time power dissipation includes a total power dissipation of all strings, $P_R$, $P_G$, and $P_B$ plus the total measured quiescent power dissipation $P_Q$. Although presented in the context of groups of strings determined by color, some embodiments may perform calculations based on groups of strings based on other criteria. For example, where all solid-state lighting devices are configured to emit light at the same dominant wavelength and/or spectrum, the strings may be grouped according to relative location or not grouped at all.

Figure 6:
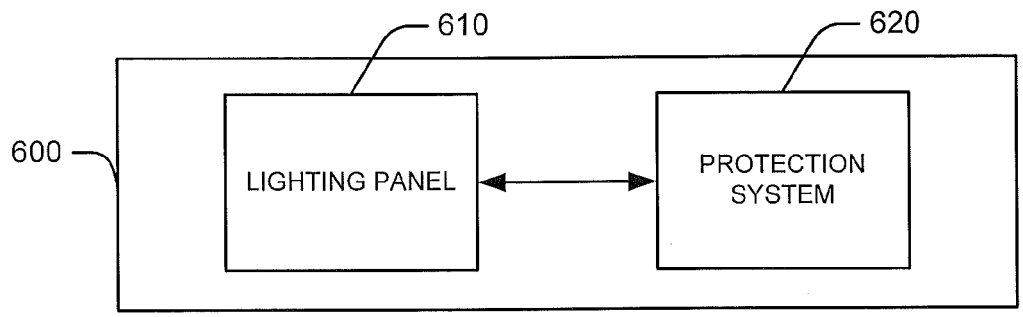
FIG. 6 is a block diagram illustrating a lighting panel system according to some embodiments of the present invention.

Reference is now made to FIG. 6, which is a block diagram illustrating a lighting panel system 600 according to some embodiments of the present invention. The lighting panel system 600 may include a lighting panel 610 that includes multiple strings of solid-state lighting devices arranged across the panel. In some embodiments, a lighting panel 610 may be arranged as multiple bars, each capable of including multiple strings. In some embodiments, a lighting panel 610 may be arranged as multiple tiles, each including one or more solid-state lighting devices, such that the multiple tiles may be connected to each other in one or more dimensions.

Some embodiments of a lighting panel system 600 include a protection system 620 that is configured to determine an adverse operating condition and adjust a lighting panel luminance setting responsive to the adverse operating condition. In some embodiments, the adverse operating condition includes power dissipation that exceeds one or more system power limits. For example, in some embodiments, if the power dissipation exceeds a first power limit, the protection system may reduce the lighting panel luminance setting incrementally until the power dissipation is below the first power limit. In some embodiments, if the power consumption exceeds a second power limit that is higher than the first power limit, the protection system may reduce lighting panel luminance setting to a minimum value.

In some embodiments, a minimum value may include a minimum luminance setting composite value that may be configured to maintain relative duty cycle values among individual strings and/or groups of solid-state lighting devices. In some embodiments, reducing the lighting panel luminance setting to a minimum value may include reducing the duty cycle for all of the strings and/or groups of solid-state lighting devices to a minimum value.

In some embodiments, the protection system 620 may be configured to determine power dissipation using a real-time power calculation. Some embodiments of the real-time power calculation may be performed by utilizing a stored power valued that may be pre-computed during system calibration and/or testing and may be memory accessible by a system controller. In some embodiments, a stored value may include, for example, a total quiescent power dissipation and includes the total power dissipation when all of the multiple strings are in a de-energized state corresponding to, for example, a zero percent duty cycle. In some embodiments, a stored value may include a value specific to a portion of the strings that include solid-state lighting devices configured to emit light in a first dominant wavelength. In such embodiments, a stored value may correspond to the expression $$\sum_{i=0}^{N}(P_i \times Ratio_i),$$

where $P_i$ is the power dissipation for each of N quantity individual strings and $Ratio_i$ is a bar ratio for the individual strings. In some embodiments, the real-time power calculation may utilize base duty cycle values that are available in real time.

In some embodiments, the adverse operating condition may include a panel temperature that exceeds a system temperature limit. The protection system 620 may be configured to determine the panel temperature using, for example, a driver temperature sensor. Since measuring actual lighting component temperatures in a lighting panel may be difficult without interfering with the normal operation of the lighting panel, the display driver may have a temperature that corresponds to the lighting panel temperature. In this manner, a reliable and available temperature signal may be available. In some embodiments, if the panel temperature exceeds a first temperature limit, the protection system may reduce a lighting panel luminance setting incrementally until the panel temperature is below the first temperature limit. In further embodiments, if the panel temperature exceeds a second temperature limit, the protection system may reduce the lighting panel luminance setting to a minimum value.

In some embodiments, the protection system 620 may utilize a gain adjuster configured to improve a response to the adverse operating condition. In some embodiments, gain adjuster may be configured to determine a response magnitude corresponding to a magnitude of the adverse operating condition to improve a performance of the protection system in response to the adverse operating condition. For example, a magnitude of an incremental reduction may be adjusted responsive to the amount that the panel temperature exceeds a temperature limit. In this manner, the temperature and/or power control system may reduce overshoot, oscillations, and/or other undesirable control system phenomena.

In some embodiments the protection system 620 may utilize hysteresis function configured to improve a response to the adverse operating condition by generating hysteresis values corresponding to an operating condition threshold to improve a performance of the protection system in response to the adverse operating condition. For example, hysteresis values may be utilized to improve control performance in a system that may include elements of control system intertia. In some embodiments, hysteresis curves may be generated that vary the magnitude of the incremental reduction/increase in luminance setting at varying points on each side of the temperature and/or power limit.

Figure 7:
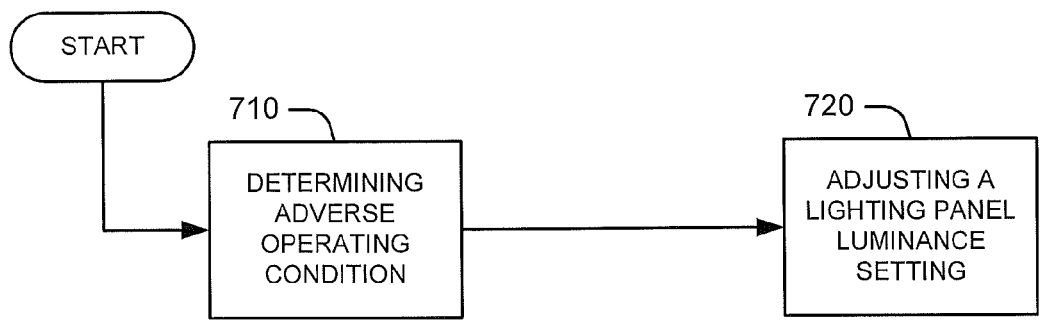
FIG. 7 is a flow diagram illustrating operations for protecting components in a lighting panel having strings of solid state lighting devices according to some embodiments of the present invention.

Reference is now made to FIG. 7, which is a flow diagram illustrating operations for protecting components in a lighting panel having strings of solid state lighting devices according to some embodiments of the present invention. In some embodiments, operations include determining an adverse operating condition (block 710). Adverse operating conditions can include, for example, a total power dissipation and/or panel temperature that exceed system limits. In some embodiments, other operating parameters may be defined to meet particular operating requirements. In response to an adverse operating condition, a light panel luminance setting may be adjusted (block 720). In some embodiments, adjusting a light panel luminance setting may include adjusting a response gain to improve a response to the adverse operating condition. For example, the gain may be adjusted by changing the increments used in reducing/increasing the luminance setting depending on the amount by which the temperature and/or power exceed a limit and/or threshold. In some embodiments, adjusting the lighting panel luminance setting comprises generating hysteresis values to improve a response to the adverse operating condition. In some embodiments, determining that the panel temperature exceeds the system temperature limit may include receiving a signal from a driver temperature sensor.

Figure 8:
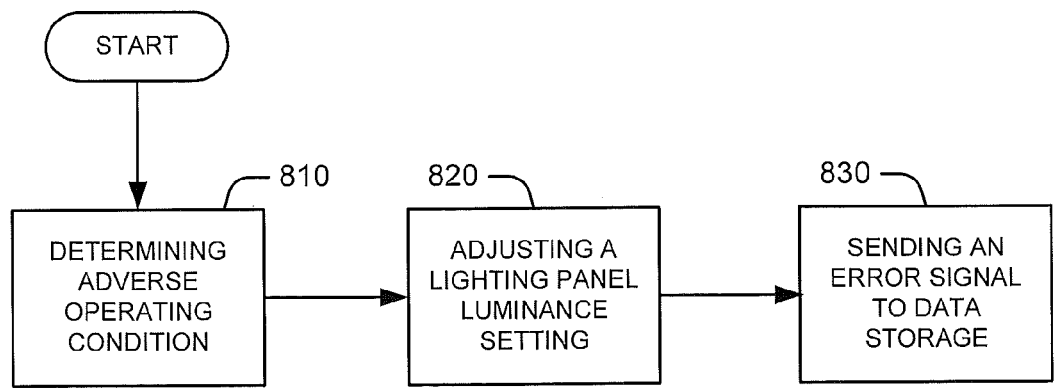
FIG. 8 is a flow diagram illustrating operations for protecting components in a lighting panel having strings of solid state lighting devices according to further embodiments of the present invention.

Reference is now made to FIG. 8, which is a flow diagram illustrating operations for protecting components in a lighting panel having strings of solid state lighting devices according to further embodiments of the present invention. In some embodiments, such operations include determining an adverse operating condition (block 810). In response to the adverse operating condition, a light panel luminance setting may be adjusted (block 820). In some embodiments, an error signal may be sent to a data storage device and/or location (block 830). The data storage device and/or location may include a register, processor memory, memory cache and/or system memory, among others. Some embodiments of the data storage locations may be configured in a database, table and/or list, among others.

Figure 9:
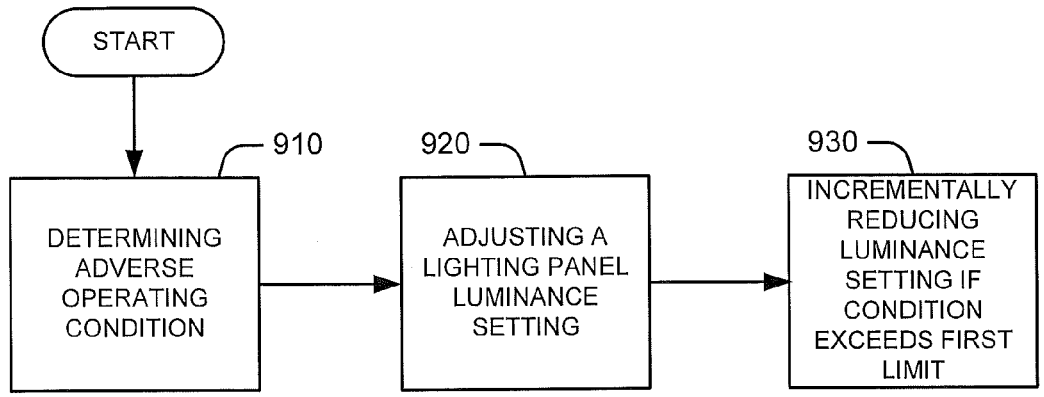
FIG. 9 is a flow diagram illustrating operations for protecting components in a lighting panel having strings of solid state lighting devices according to yet further embodiments of the present invention.

Reference is now made to FIG. 9, which is a flow diagram illustrating operations for protecting components in a lighting panel having strings of solid state lighting devices according to yet further embodiments of the present invention. In some embodiments, operations include determining an adverse operating condition (block 910). In response to the adverse operating condition, a light panel luminance setting may be adjusted (block 920). In some embodiments, a luminance setting may be incrementally reduced if the condition exceeds a first limit (block 930). In some embodiments, an incremental reduction may be iteratively performed until the operating condition no longer exceeds the first limit.

Figure 10:
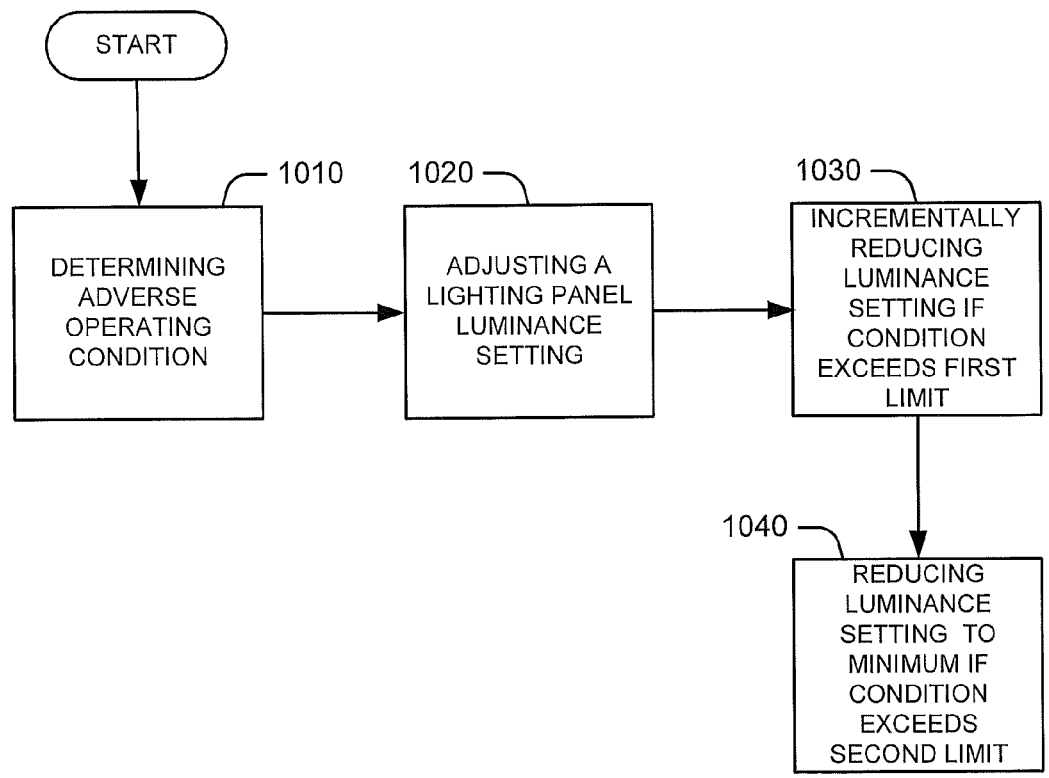
FIG. 10 is a flow diagram illustrating operations for protecting components in a lighting panel having strings of solid state lighting devices according to some embodiments of the present invention.

Reference is now made to FIG. 10, which is a flow diagram illustrating operations for protecting components in a lighting panel having strings of solid state lighting devices according to some embodiments of the present invention. In some embodiments, operations include determining an adverse operating condition (block 1010). In response to the adverse operating condition, a light panel luminance setting may be adjusted (block 1020). In some embodiments, a luminance setting may be incrementally reduced if the operating condition exceeds a first limit (block 1030). Operations may further include reducing the luminance setting to a minimum value if the operating condition exceeds a second limit (block 1040). For example, when the incremental reduction in the luminance setting fails to bring operating condition below the first limit in the operating condition exceeds a second higher limit, the duty cycles for all of the strings may be reduced to a minimum value, such as, for example, twenty percent.

Figure 11:
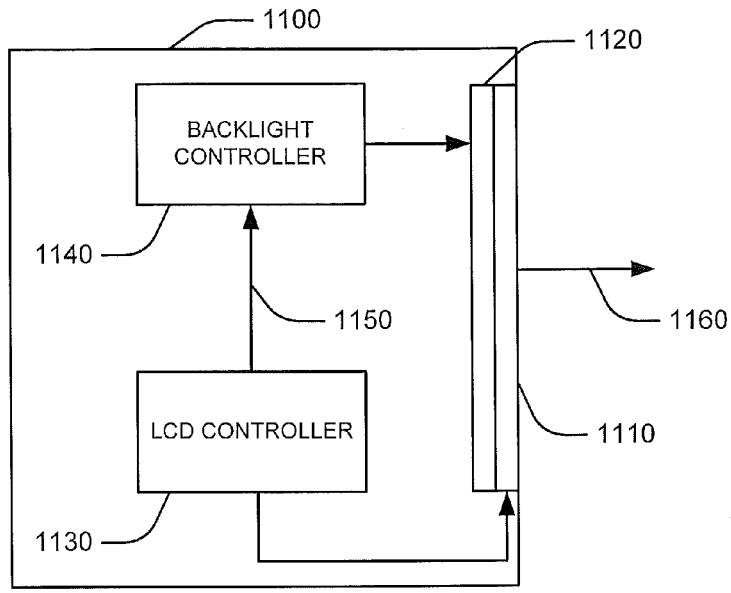
FIG. 11 is a block diagram illustrating backlit display device according to some embodiments of the present invention.

Reference is now made to FIG. 11, which is a block diagram illustrating backlit display device according to some embodiments of the present invention. A display device 1100 may include an LCD panel 1110, including a two-dimensional arrangement of liquid crystal shutters, that is controlled by an LCD controller 1130. The LCD controller 1130 may control the output image 1160 by varying on/off values of the LCD shutters corresponding to different color pixels.

The LCD panel 1110 relies on dynamic light transmission to control an output image 1160. In this manner, the display device 1100 may also include a lighting panel 1120 configured to provide light to be selectively transmitted through the shutters of the LCD panel 1110. A lighting panel 1120 may include multiple strings of solid-state lighting emitters that can be controlled to achieve a desired color hue and/or luminous intensity. Varying the output of the string may be accomplished, for example, by firing the string for a portion of a period, which may be controlled by a backlight controller 1140. In some embodiments, adverse operating conditions may be addressed by adjusting the luminance setting of the solid-state backlight panel 1120. In this manner, display components may be protected from effects of the adverse operating conditions without completely terminating operation of the display device 1100.

Figure 12:
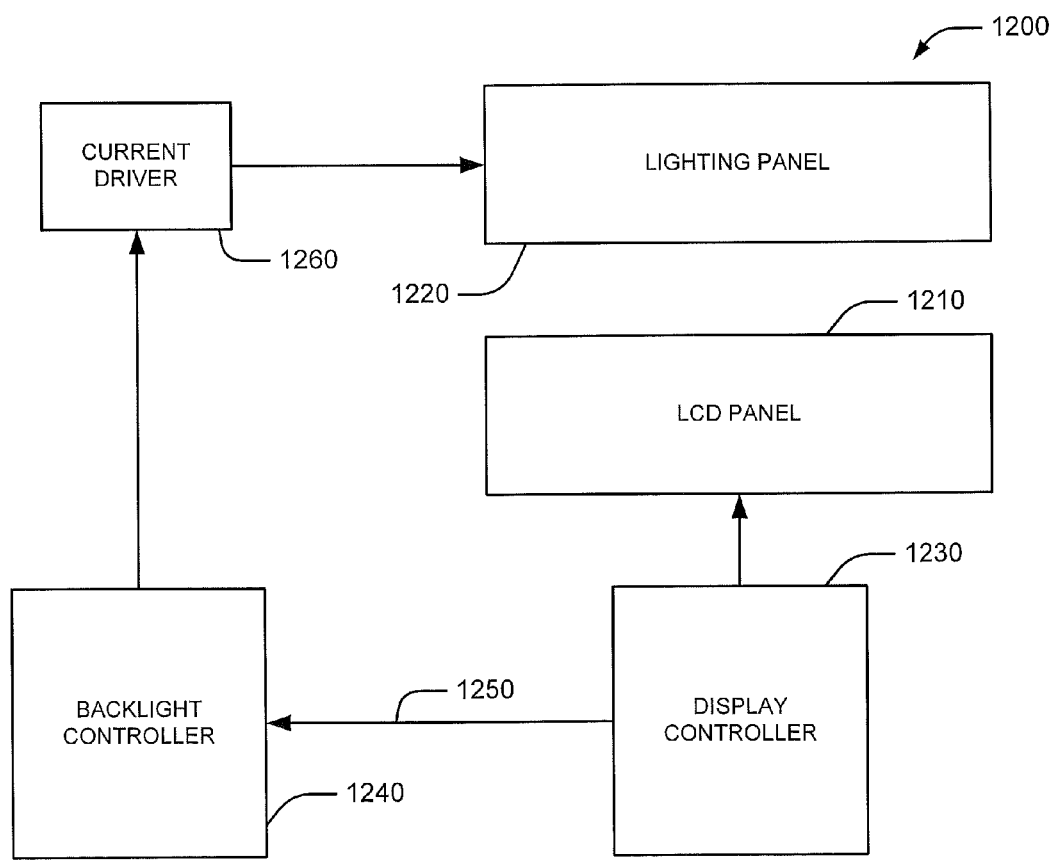
FIG. 12 is a block diagram illustrating systems/methods for controlling a solid-state backlighting panel in backlit display device according to some embodiments of the present invention.

Reference is now made to FIG. 12, which is a block diagram illustrating systems/methods for protecting components in a backlit display device by controlling a lighting panel according to some embodiments of the present invention. An LCD panel 1210 is controlled by a display controller 1230, which refreshes the pixels and the LCD panel 1210 at a predetermined refresh rate. A lighting panel 1220 may also be included for providing luminance through the LCD panel 1210. The lighting panel 1220 may be controlled by a backlight controller 1240 that can drive multiple strings of solid-state lighting emitters using a current driver 1260. The output of the lighting panel 1220 may be controlled by firing the emitters for specific portions of a period. In some embodiments, adverse operating conditions may be addressed by adjusting the luminance setting of the lighting panel 1120. In this manner, display components may be protected from effects of the adverse operating conditions without completely terminating operation of the display device.

Figure 13:
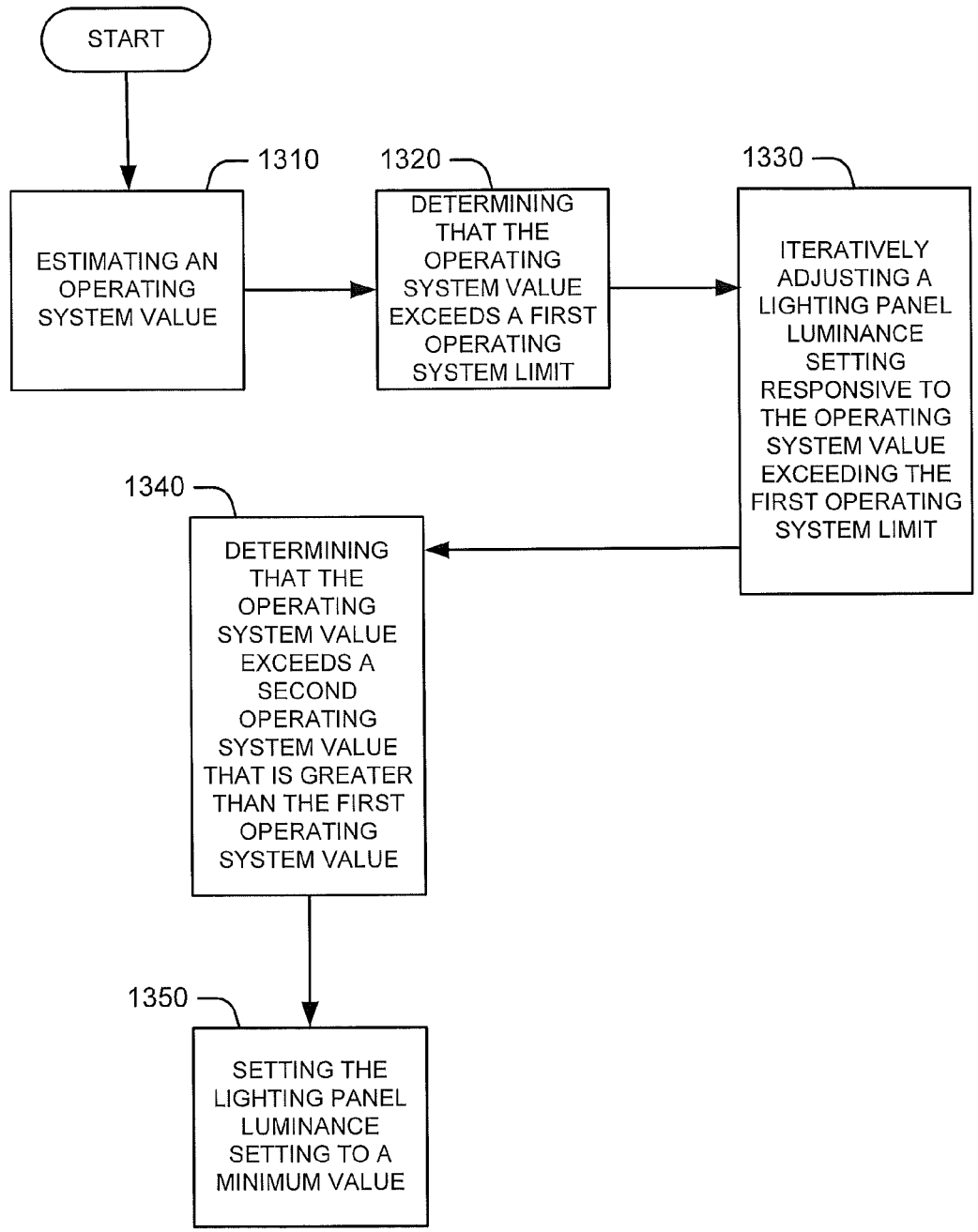
FIG. 13 is a flow diagram illustrating operations for protecting components in a lighting panel including a plurality of strings of solid state lighting devices according to some embodiments of the present invention.

Reference is made to FIG. 13, which is a flow diagram illustrating operations for protecting components in a lighting panel including a plurality of strings of solid state lighting devices according to some embodiments of the present invention. Operations include estimating an operating system value in the lighting panel (block 1310), determining that the operating system value exceeds a first operating system limit (block 1320) and iteratively adjusting a lighting panel luminance setting responsive to the operating system value exceeding the first operating system limit (block 1330). Operations may include determining that the operating system value exceeds a second operating system limit that is greater than the first operating system limit (block 1340) and setting the lighting panel luminance setting to a minimum value (block 1350).

Figure 14:
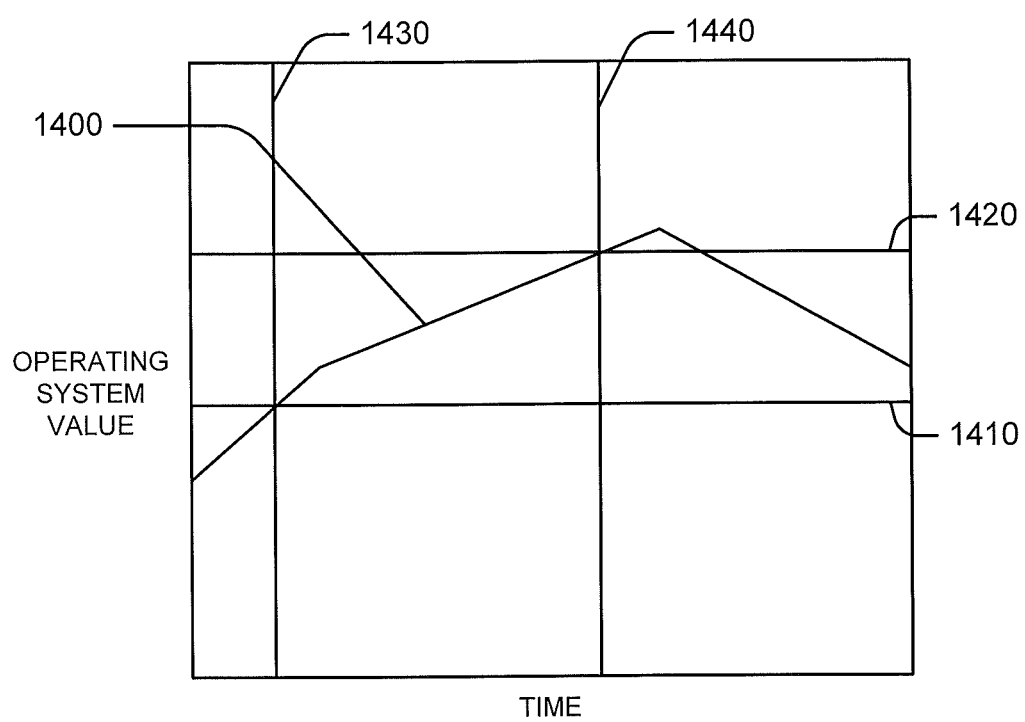
FIG. 14 is a graph illustrating an operating system value and first and second operating system limits in a lighting panel including a plurality of strings of solid state lighting devices according to some embodiments of the present invention.

Reference is made to FIG. 14, which is a graph illustrating an operating system value and first and second operating system limits in a lighting panel including a plurality of strings of solid state lighting devices according to some embodiments of the present invention. The graph include a plot of an exemplary operating system value 1400 that exceeds a first operating system limit 1410 at time 1430 and a second operating system limit 1420 that is greater than the first operating system limit 1410 at time 1440.

Although some embodiments are described in connection with LCD backlights, embodiments of the invention may be used for other purposes, such as general lighting. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of protecting components in a lighting panel including a plurality of strings of solid state lighting devices, the method comprising:
    estimating an operating system value in the lighting panel;
    determining that the operating system value exceeds a first operating system limit;
    iteratively adjusting a lighting panel luminance setting responsive to the operating system value exceeding the first operating system limit;
    determining that the operating system value exceeds a second operating system limit that is greater than the first operating system limit; and
    setting the lighting panel luminance setting to a minimum value.

2. The method of claim 1, further comprising incrementally increasing the lighting panel luminance setting if the operating system value is less than the first operating system limit.

3. The method of claim 2, wherein the operating system value comprises a power dissipation value, wherein the first operating system limit comprises a first power limit, and wherein the second system operating limit comprises a second power limit.

4. The method of claim 2, wherein the operating system value comprises a panel temperature value, wherein the first operating system limit comprises a first temperature limit, and wherein the second system operating limit comprises a second temperature limit.

5. A lighting panel system, comprising:
    a lighting panel including a plurality of strings of solid state lighting devices arranged across the panel; and
    a protection system configured to determine an adverse operating condition and adjust a duty cycle that corresponds to a lighting panel luminance setting responsive to the adverse operating condition,
    wherein the adverse operating condition comprises power dissipation that exceeds a system power limit,
    wherein if the power dissipation exceeds a first power limit the protection system is configured to reduce the lighting panel luminance setting incrementally until the power dissipation is below the first power limit, and
    wherein if the power dissipation exceeds a second power limit that is higher than the first power limit, the protection system is configured to reduce the lighting panel luminance setting to a minimum value.

6. The system of claim 5, wherein if the lighting panel luminance setting is adjusted responsive to the adverse operating condition, an error signal is registered in a data storage location.

7. The system of claim 5, further comprising a gain adjuster configured to determine a response magnitude corresponding to a magnitude of the adverse operating condition to improve a performance of the protection system in response to the adverse operating condition.

8. The system of claim 5, further comprising a hysteresis function configured to generate hysteresis values corresponding to an operating condition threshold to improve a performance of the protection system in response to the adverse operating condition.

9. A backlit display device configured to utilize the lighting panel system of claim 5.

10. The system of claim 5, wherein the adverse operating condition comprises a panel temperature that exceeds a system temperature limit.

11. The system of claim 10, wherein the protection system is configured to determine the panel temperature using a driver temperature sensor.

12. The system of claim 10, wherein if the panel temperature exceeds a first temperature limit the protection system is configured to reduce the lighting panel luminance setting incrementally until the panel temperature is below the first temperature limit.

13. The system of claim 10, wherein if the panel temperature exceeds a second temperature limit, the protection system is configured to reduce the lighting panel luminance setting to a minimum value.

14. The system of claim 5, wherein the protection system is further configured to determine the power dissipation via a real time power calculation.

15. The system of claim 14, wherein the real time power calculation utilizes base duty cycles that are available in real time.

16. The system of claim 14, wherein the real time power calculation utilizes a stored power value that is pre-computed during system calibration and memory accessible by a system microcontroller.

17. The system of claim 16, wherein the stored value comprises a total quiescent power dissipation that includes the total power dissipation when the plurality of strings are in a de-energized state corresponding to a zero percent duty cycle.

18. The system of claim 16, wherein the stored value comprises a value specific to a portion of the plurality of strings including solid state lighting devices that emit light in a first dominant wavelength and determined by the expression $$\sum_{i=0}^{N} (P_i \times Ratio_i).$$

19. A method of protecting components in a lighting panel including a plurality of strings of solid state lighting devices, the method comprising:
  determining an adverse operating condition in the lighting panel;
  adjusting a duty cycle that corresponds to a lighting panel luminance setting responsive to the adverse operating condition, wherein determining the adverse operating condition comprises determining that power dissipation exceeds a system power limit;
  if the power dissipation exceeds a first power limit, reducing the lighting panel luminance setting incrementally until the power dissipation is below the first power limit; and
  if the power dissipation exceeds a second power limit that is greater than the first power limit, reducing the lighting panel luminance setting to a minimum value.

20. The method of claim 19, further comprising sending an error signal to a data storage location responsive to adjusting the lighting panel luminance setting.

21. The method of claim 19, wherein adjusting the lighting panel luminance setting comprises adjusting a response gain to improve a response to the adverse operating condition.

22. The method of claim 19, wherein adjusting the lighting panel luminance setting comprises generating hysteresis values to improve a response to the adverse operating condition.

23. The method of claim 19, wherein determining the adverse operating condition comprises determining that a panel temperature exceeds a system temperature limit.

24. The method of claim 23, wherein determining that the panel temperature exceeds the system temperature limit comprises receiving a signal from a driver temperature sensor.

25. The method of claim 19, wherein determining the power dissipation comprises calculating a real time power value.

26. The method of claim 25, wherein calculating the real-time power value comprises retrieving a stored power value that is precomputed during system calibration.

27. The method of claim 26, wherein the stored power value comprises a total quiescent power dissipation that includes the total power dissipation when the plurality of strings are in a de-energized state corresponding to a zero-percent duty cycle.

28. The method of claim 26, wherein calculating the real-time power value comprises determining base duty cycles in real time.

* * * * *